United States Patent

Skrobisch

[15] 3,644,763
[45] Feb. 22, 1972

[54] LIMITED ANGLE DC TORQUE MOTOR

[72] Inventor: Alfred Skrobisch, Huntington, N.Y.

[73] Assignee: Allard Instrument Corporation, Westbury, N.Y.

[22] Filed: Dec. 8, 1970

[21] Appl. No.: 96,134

[52] U.S. Cl. ...................................310/36, 310/72, 335/229
[51] Int. Cl. .............................................................H02k 33/02
[58] Field of Search .................................310/36–39, 40, 310/46, 156, 72; 318/665; 335/229, 230, 272, 222

[56] References Cited

UNITED STATES PATENTS

| | | | |
|---|---|---|---|
| 1,202,446 | 10/1916 | Speed | 310/36 X |
| 3,483,410 | 12/1969 | Siegelman et al | 310/36 X |
| 2,771,572 | 11/1956 | Adams | 310/36 X |
| 3,089,044 | 5/1963 | Bolton | 310/36 |
| 3,076,111 | 1/1963 | Burgwin | 335/222 X |
| 3,047,750 | 7/1962 | Brown | 310/38 |
| 3,539,846 | 11/1970 | Jewell | 310/46 |
| 3,152,275 | 10/1964 | Aske | 310/36 X |
| 3,139,571 | 6/1964 | Tucker et al | 318/665 |

*Primary Examiner*—D. F. Duggan
*Attorney*—Edward H. Loveman

[57] ABSTRACT

A torque motor has a stator including a ringlike magnetic casing containing four circumferentially spaced radial magnetic poles. The casing is closed by a base and cover. Wire coils connected in series are wound on two poles or on all four poles. Thin magnetic webs connect the poles and define a ring in which rotates a permanent magnet rotor. The magnetic ring constitutes a magnetic bridge which permits the rotor to float freely when the coils are deenergized. A spring or auxiliary magnetic means is provided to return the rotor to a predetermined angular position.

10 Claims, 12 Drawing Figures

PATENTED FEB 22 1972
3,644,763
SHEET 1 OF 2
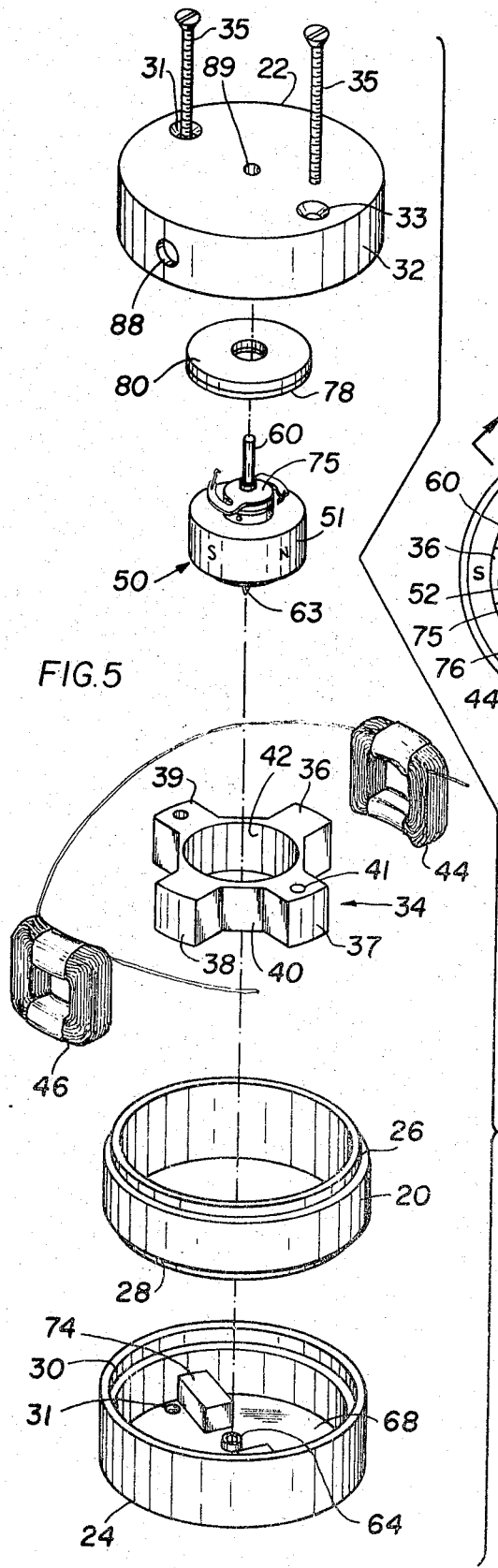
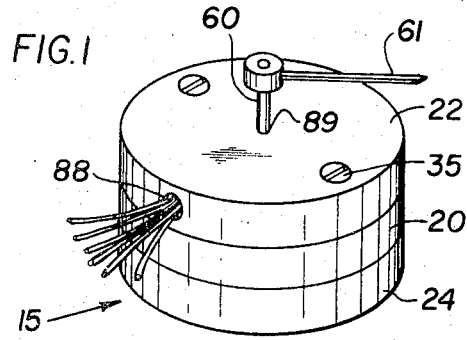
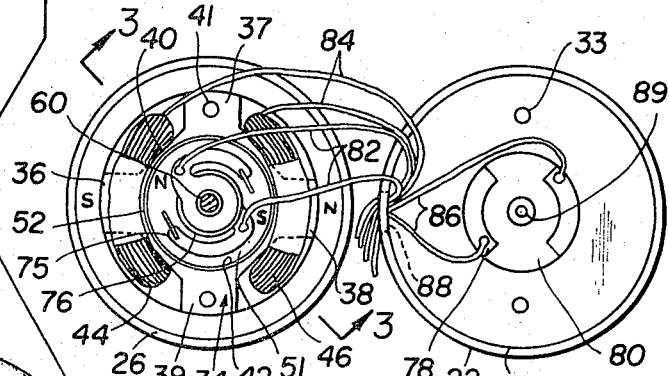
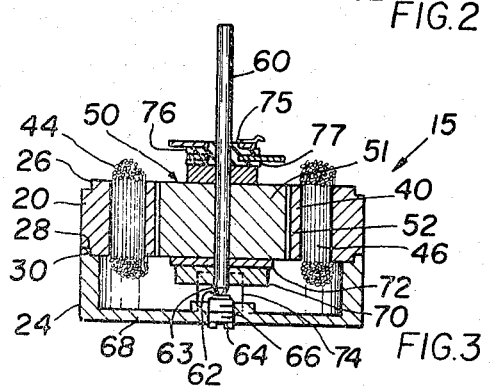
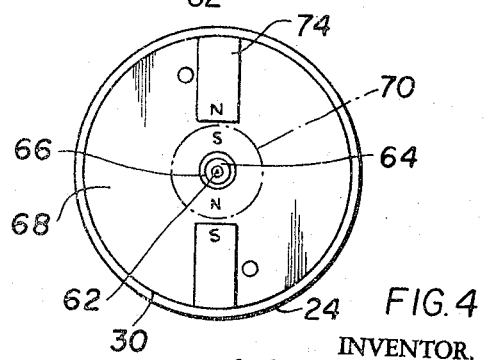
INVENTOR.
ALFRED SKROBISCH
BY Edward N Loveman
ATTORNEY PATENTED FEB 22 1972
3,644,763
SHEET 2 OF 2
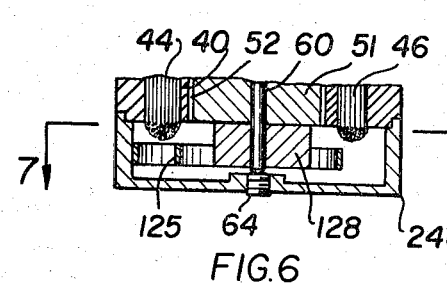
FIG. 6
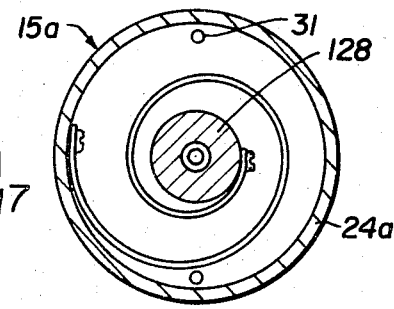
FIG. 7
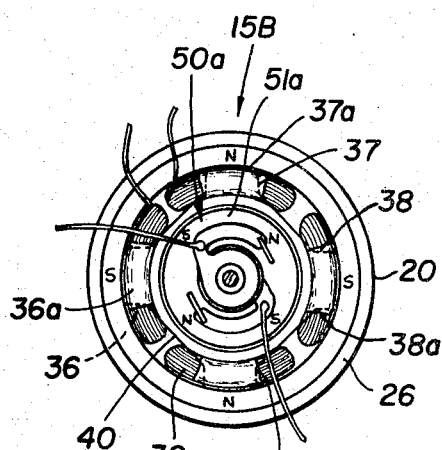
FIG. 8
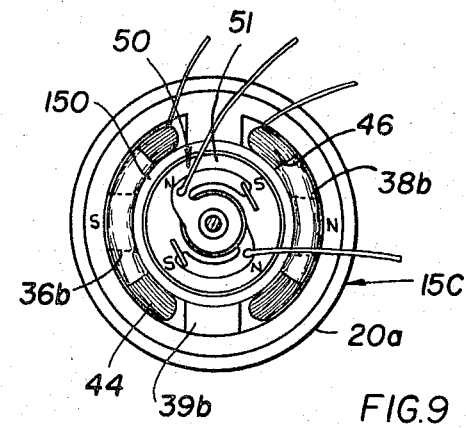
FIG. 9
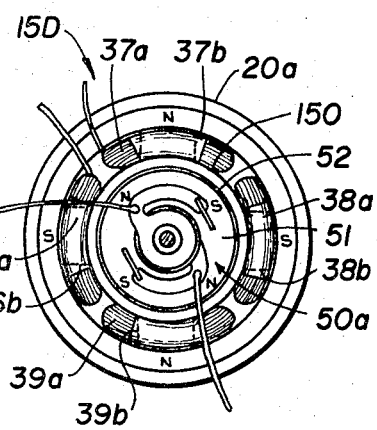
FIG. 10
FIG. 11
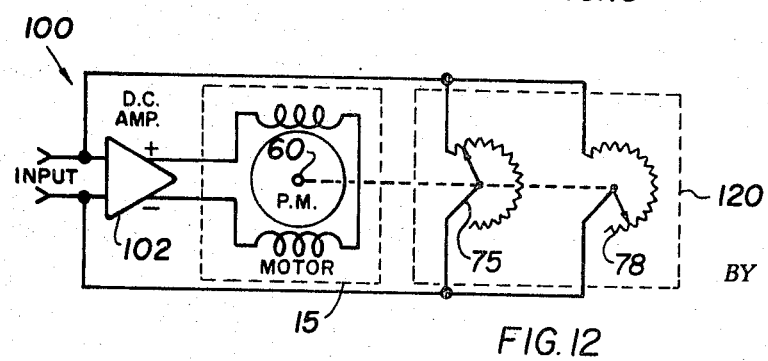
FIG. 12
INVENTOR.
ALFRED SKROBISCH
BY
Edward H. Loveman
ATTORNEY 3,644,763

LIMITED ANGLE DC TORQUE MOTOR

This invention concerns a limited angle DC torque motor and more specifically concerns a limited angle DC torque motor of the type having a permanently magnetized rotor rotating within a stator having coils energized by an external direct current source for turning the rotor.

Heretofore torque motors of miniature size used in a servomechanism for turning a shaft angularly in a range not exceeding 180° have had rather limited torque outputs. Such motors generally employ a permanently magnetized two-pole rotor rotatably supported in a stator on which is wound a coil or coils energized by an external direct current source. The small torque output is affected adversely by loss of magnetic flux in the airgap between the rotor and the magnetic parts of the stator. A further reduction in torque is caused by the strong bias of a return spring which is generally employed to return the rotor to an initial "zero" position, but which opposes turning of the rotor when the stator is energized.

It is particularly important in a torque motor of the type described, that the rotor rotate as freely as possible in the stator since the rotor is often called upon to respond to changes in the actuating magnetic field of the stator, occuring as frequently as several hundred times per second. This condition is encountered when the torque motors are used in a loop of a servomechanism to drive chart recording pens and pointers of indicators of various kinds.

According to the present invention, the novel torque motor has a stator formed with four magnetic poles spaced 90° apart. Wire coils may be wound on two or four of the poles. Extending circumferentially around the rotor and between poles is a thin ring or bridge which minimizes the airgap between the rotor and the stator and serves as a magnetic bridge so that the rotor floats freely when the direct current supplied to the coils is turned off. A return spring may be provided for returning the rotor to a zero position. A feedback potentiometer may be mounted near the rotor with a wiper arm carried by the rotor. This potentiometer is connected in a feedback circuit to the input of a DC amplifier supplying the current to the coils of the motor. The arrangement described makes it possible to construct a miniature torque motor exerting much greater torque than has heretofore been attainable with conventional torque motors of comparable size. Furthermore angular deflections of the rotor are accomplished with lower applied current.

Accordingly, it is a principal object of the instant invention to provide an angularly limited DC permanent magnetic torque motor having large torque output.

Another object of the instant invention is to provide such a torque motor having little loss of magnetic flux in the airgap between the rotor and the magnetic parts.

These and other objects and many of the attendant advantages of this invention will be readily appreciated as the same becomes better understood by reference to the following detailed description when considered in connection with the accompanying drawing in which:

FIG. 1 is an external perspective view of a torque motor embodying the invention;

FIG. 2 is an enlarged plan view of the motor with cover removed and inverted;

FIG. 3 is a cross-sectional view taken along line 3—3 of FIG. 2;

FIG. 4 is an enlarged plan view of the base of the motor;

FIG. 5 is an exploded perspective view of parts of the motor of FIG. 1;

FIG. 6 is a cross-sectional view similar to a portion of FIG. 3, showing another spring return means for the rotor;

FIG. 7 is a cross-sectional view taken along line 7—7 of FIG. 6;

FIG. 8 is a top plan view showing an embodiment of the torque motor with four coils;

FIG. 9 is a top plan view showing a further torque motor with a ring insert magnetically bridging the rotor;

FIG. 10 is an exploded perspective view of the ring insert and pole structure employed in the motor of FIG. 9;

FIG. 11 is a top plan view showing another torque motor with four coils and a bridging ring insert; and FIG. 12 is a diagram of a torque motor and an associated power supply and feedback circuit.

Referring now to the drawings wherein like reference characters designate like or corresponding parts throughout, there is illustrated in FIGS. 1 through 5 a torque motor generally designated as reference numeral 15 which includes a central cylindrical stator or casing 20, a cuplike cover 22 and a cuplike base 24. As best illustrated in FIGS. 3 and 5 each end of the casing 20 is formed with a circumferential rabbet 26, 28 which engage a mating circumferential lip 30 of the base and a sidewall 32 of the cover respectively so that the entire assembly is cylindrical and of uniform external diameter as shown in FIG. 1. A pair of aligned holes 31, 33 in the base and the cover respectively receive a pair of screws 35 to hold the parts together. The casing 20 is a ring made of highly permeable magnetic material such as soft iron which has snugly fitted therein a pole structure 34 having four radial poles 36–39 each of which is joined by a thin circumferentially extending integral web 40 constituting a bridge between the poles (see FIGS. 2, 3, 5). The pole structure has a central hole 42 bounded by the four webs 40 and the inner ends of the four poles. A pair of generally rectangular wire coils 44, 46 are mounted on diametrically opposite poles 36 and 38, respectively and connected together in series. The coils are wound so that one pole is a NORTH magnetic pole whole the diametrically opposite poles is a SOUTH pole when the coils are energized. Rotatably mounted inside the casing 20 is a permanently magnetized cylindrical rotor 50 having a permanently magnetized body 51 with diametrically opposite NORTH and SOUTH poles. The circumferential air gap 52 is just sufficient to provide rotational clearance for the rotor 50 and may be as small as 0.005 of an inch. It will be noted that the central hole 42 is not obstructed by the coil windings 44, 46 as occurs in prior torque motors.

The thin webs or bridges 40 serve to concentrate magnetic flux to such an extent that they are normally saturated when the coils are energized. Under this condition, the saturated bridges have a negligible effect in diverting the magnetic field used to produce rotation of the rotor 50. However, when the coils are deenergized, the bridge structure 40 serves as a magnetic shield or keeper that is no longer saturated whereby the N and S poles of the permanent magnet rotor 50 are not attracted to any particular point around the surrounding bridge structure and thus the rotor in effect floats free when the coils are deenergized. This characteristic is very important since it insures instantaneous response to any change in energization of the coils to deflect the rotor in one direction or another.

The rotor has a central axial shaft 60 which may carry a pointer 61 at its upper end see FIG. 1. The shaft 60 has a pivot point 63 at its lower end rests on a jeweled bearing 62 located in the end of a screw 64 inserted in a threaded hole 66 at the bottom 68 of the base 24. The shaft also carries a small magnetized disk 70 spaced axially from rotor body 51 by a nonmagnetic spacer 72 (see FIGS. 2 and 3). Mounted on the base 24 is a pair of small diametrically opposed bar magnets 74 which tend to turn the rotor to a predetermined zero position with its N pole located somewhere between the poles 36 and 38 of the stator 20. This magnetic return arrangement for the rotor exerts a negligible bias so that the turning torque applied to rotor 50 by the magnetic field created by the energized coils is not materially reduced. The screws 35 extend through a pair of holes 41 in the poles 37, 39 to hold the pole structure 34 in place in the stator 20.

Mounted on top of the rotor body 51 is a pair of wiper arms 75 spaced by a pair of insulators 76, 77. The arms 75 contact a resistor 78 on the plate 80 mounted inside of the cover 22. The arms and resistor constitute a potentiometer 120 (FIG. 12) which is varied in resistance between a pair of wire leads 82 connected to the wiper arms 75 as the rotor turns to different angular positions (FIG. 2). These leads along with a pair of leads 84 connected to the coils 44, 46 and a pair of leads 86 connected to the resistor 78 extend through an opening 88 provided in the side of the cover 22. The leads may be connected to an external circuit such as a circuit 100 shown in FIG. 12. The shaft 60 extends through a hole 89 in the cover 22.

In the circuit 100 shown in FIG. 12, signals are applied to a direct current amplifier 102 whose output is connected to coils 44, 46 of the motor 15. The shaft 60 drives arms 75 of the potentiometer 120 whose resistor 78 is connected in circuit with the arms 75 to the input of the amplifier 102 in a conventional feedback circuit. A feedback signal which is proportional to the angular deflection of the shaft 60 is thus applied to the amplifier input.

In FIGS. 6 and 7 is shown part of another torque motor 15A in which parts corresponding to those of motor 15 are identically numbered. In this motor, the inner end of a coil spring 125 is attached to a nonmagnetic disk 128 secured to the shaft 60 and the body 51. The outer end of the spring 125 is secured to the inside wall of the base 24a. This spring serves to return the angularly turned rotor to a predetermined zero or initial position when current is cut off from the coils 44, 46.

FIG. 8 shows another torque motor 15B which is basically the same as torque motor 15 except that four coils 36a, 37a, 38a and 39a are connected in series and mounted on the four poles 36–39 respectively of the pole structure. Other parts corresponding to those of torque motor 15 are identically numbered. The body 51a of rotor 50a is permanently magnetized in quadrature with four alternating N and S poles spaced angularly 90° apart. The torque motor 15B will have a smaller angular range than that of motor 15, i.e., somewhat less than 90° but this angular extent will suffice for many indicating, metering and recording applications. More significantly a torque motor with this configuration will produce a torque several times greater than that produced by the torque motor of FIGS. 1–5.

FIGS. 9 and 10 show an alternate pole and magnetic bridge structure for torque motor 15C. Here poles 36b–39b are integral with the ringlike case 20a and extend radially outward therefrom with the coils 44 and 46 mounted on diametrically opposite poles. A thin ring 150 made of a magnetic metal is snugly fitted inside the poles and defines a magnetic bridge structure equivalent to the webs 40 of motor 15.

FIG. 11 shows a torque motor 15D employing the same ring 150 and case 20a as motor 15C, but has four coils 36a–39a mounted on the four poles 36b–39b respectively. This motor operates like motor 15B with high torque but with an angular range of the quadrature magnetized rotor 50a limited to less than 90°.

All of the torque motors 15B–15D may employ spring return or magnetic return means for the rotor as shown in FIGS. 4 and 7.

It should be understood that the foregoing relates to only preferred embodiments of the invention, and that it is intended to cover all changes and modification of the example of the invention herein chosen for the purposes of the disclosure, which do not constitute departures from the spirit and scope of the invention.

The invention claimed is:

1. A limited angle DC torque motor adapted to be energized by a direct current, comprising
 a stator including a generally cylindrical ringlike casing with four fixed magnetizable poles extending radially in side said casing and spaced circumferentially apart, said stator including a tin magnetic bridging means magnetically connecting the inner ends of said poles and defining a central hole in said casing,
 a pair of serially wound wire coils wound respectively on two diametrically opposed poles,
 a permanently magnetized two pole rotor extending axially of said central hole,
 a shaft extending axially of said rotor and rotatable therewith and,
 a base means connected to said casing at one end thereof for rotably supporting said rotor with respect to said stator thereby permitting angular rotation therein when said coils are energized by said direct current, whereby said rotor will float freely within said stator when said coils are deenergized due to said magnetic bridging means.

2. A limited angle DC torque motor as defined in claim 1 wherein said base means includes bias means for angularly turning said rotor to a predetermined position when said coils are deenergized.

3. A limited angle DC torque motor as defined in claim 2 further comprising a cover at the other end of said casing,
 a first potentiometer means supported by said cover, and,
 a second potentiometer means carried by said rotor and arranged for cooperation with said first potentiometer means when said first and second potentiometer means are energized by said direct current.

4. A limited angle DC torque motor as defined in claim 1, wherein said magnetic bridging means is a ringlike structure including thin magnetic metal webs integral with said poles.

5. A limited angle DC torque motor as defined in claim 1 wherein said magnetic bridging means is a tin ring snugly fitted inside of said poles and said poles being integrally formed with said casing.

6. A limited angle DC torque motor adapted to be energized by a direct current, comprising
 a stator including a generally cylindrical ringlike casing with four fixed magnetizable poles extending radially in side said casing and spaced circumferentially apart, said stator including a thin magnetic bridging means magnetically connecting the inner ends of said poles and defining a central hole in said casing,
 a wire wound coil wound on each of said poles said coils being wound serially such that adjacent poles have opposite polarities when the coils are energized by said direct current,
 a permanently magnetized four-pole rotor extending axially of said central hole,
 a shaft extending axially of said rotor and rotable therewith, and
 a base means connected to said casing at one end thereof for rotably supporting said rotor with respect to said stator thereby permitting angular rotation therein when said coils are energized by said direct current, whereby said rotor will float freely within said stator when said coils are deenergized due to said magnetic bridging means.

7. A limited angle DC torque motor as defined in claim 6 wherein said base means includes bias means for angularly turning said rotor to a predetermined position when said coils are deenergized.

8. A limited angle DC torque motor as defined in claim 7 further comprising a cover at the other end of said casing,
 a first potentiometer means supported by said cover, and,
 a second potentiometer means carried by said rotor and arranged for cooperation with said first potentiometer means when said first and second potentiometer means are energized by said direct current.

9. A limited angle DC torque motor as defined in claim 6, wherein said magnetic bridging means is a ringlike structure including thin magnetic metal webs integral with said poles.

10. A limited angle DC torque motor as defined in claim 6 wherein said magnetic bridging means is a thin ring snugly fitted inside of said poles and said poles being integrally formed with said casing.

* * * * *